Aug. 18, 1970

H. W. CROMIE 3,524,202

PROSTHETIC HEART VALVE

Filed May 19, 1967

INVENTOR.
HARRY W. CROMIE
BY
Brown, Critchlow, Flick & Peckham
ATTORNEYS.

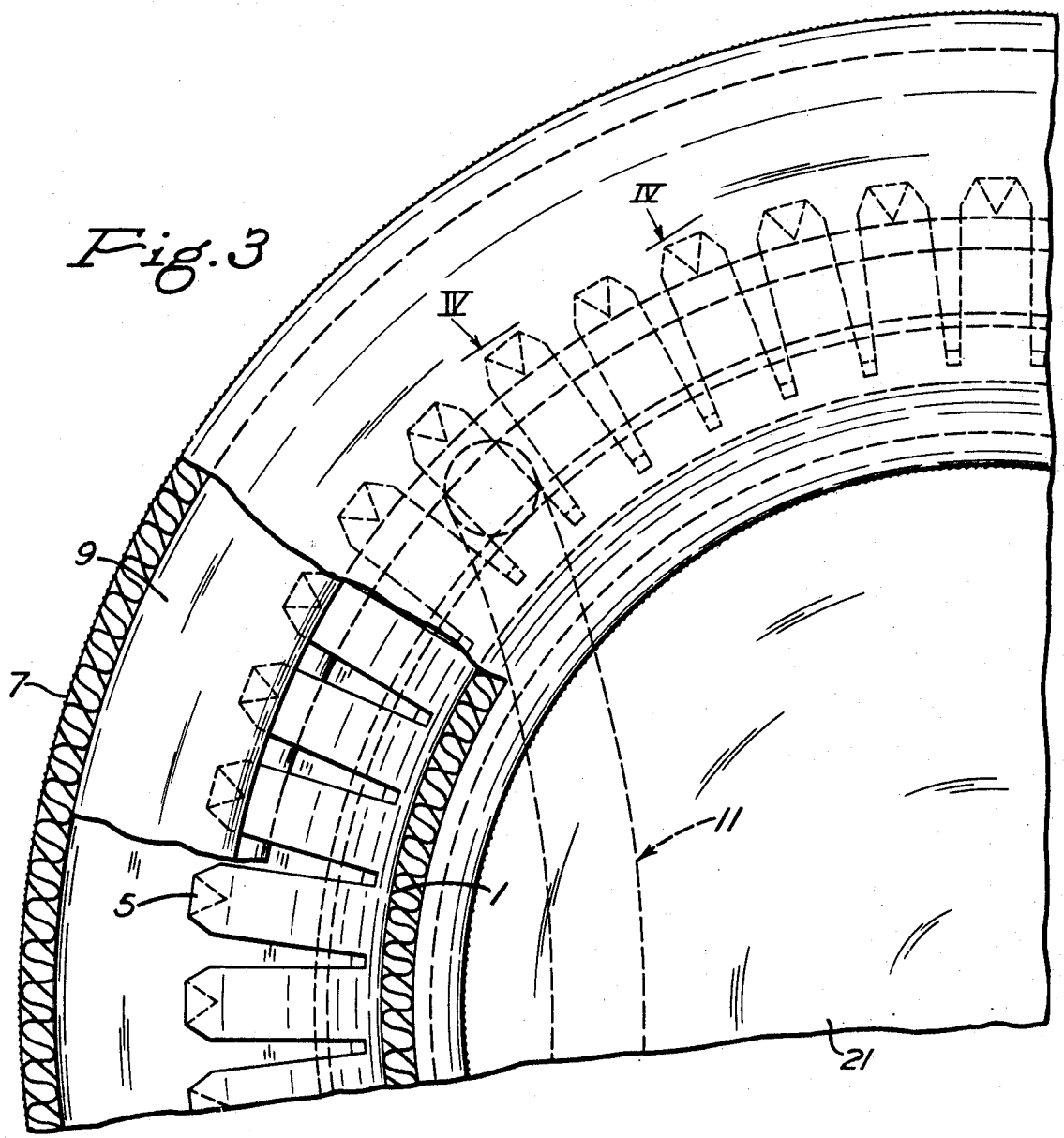

INVENTOR.
HARRY W. CROMIE

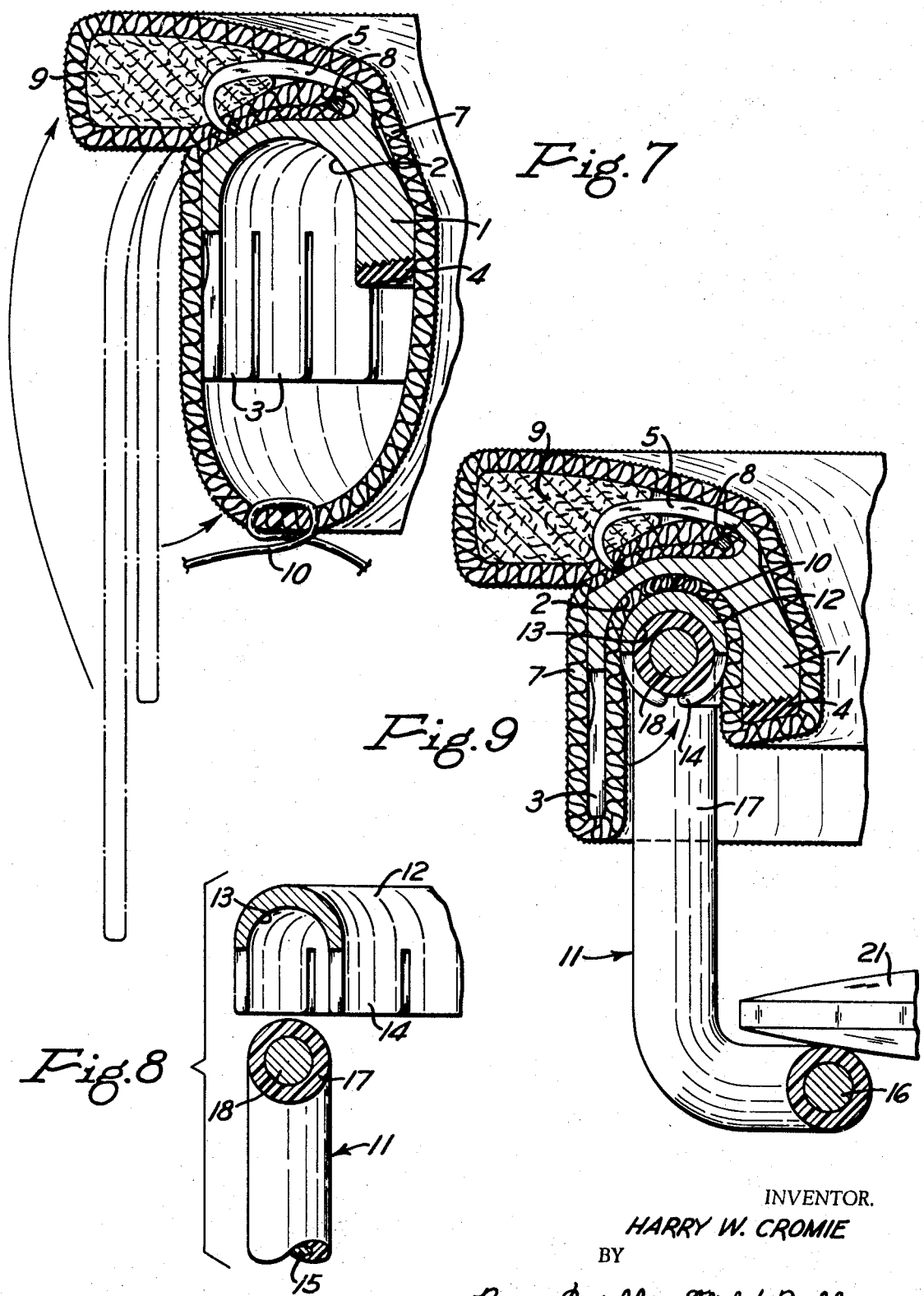

United States Patent Office 3,524,202
Patented Aug. 18, 1970

3,524,202
PROSTHETIC HEART VALVE
Harry W. Cromie, 529 Greenhurst Drive,
Pittsburgh, Pa. 15216
Filed May 19, 1967, Ser. No. 639,854
Int. Cl. A61f 1/22
U.S. Cl. 3—1                              7 Claims

ABSTRACT OF THE DISCLOSURE

Extending away from one end of an annular metal valve body, which forms a passage for blood, is a cage containing a movable closure member for the passage. A suturing ring is connected to the other end of the body and projects radially outward from it. The body and ring are completely enclosed by a fabric cover that also forms a valve seat inside the cage.

BACKGROUND OF THE INVENTION

It has been found that in some people using artificial heart valves the surrounding tissue will grow out over exposed stationary metal surfaces and sometimes break loose and enter the blood stream. Tissue also will spread over fabric and plastic surfaces of a valve, but it stops growing when it has covered that material and does not break away.

It is among the objects of this invention to provide a heart valve which has no exposed stationary metal parts, which has a surface to which tissue can strongly adhere, and which is made of parts that can be quickly assembled into a compact unit.

The preferred embodiment of the invention is illustrated in the accompanying drawings, in which FIG. 1 is a side view, partly in section, of my valve;

FIG. 3 is an enlarged fragmentary view of the opposite end of the valve with parts broken away;

FIG. 4 is a section taken on the line IV—IV of FIG. 3; and

FIGS. 5 to 9 are fragmentary cross sections of parts of the valve, showing different steps in their assembly.

Figure 5:
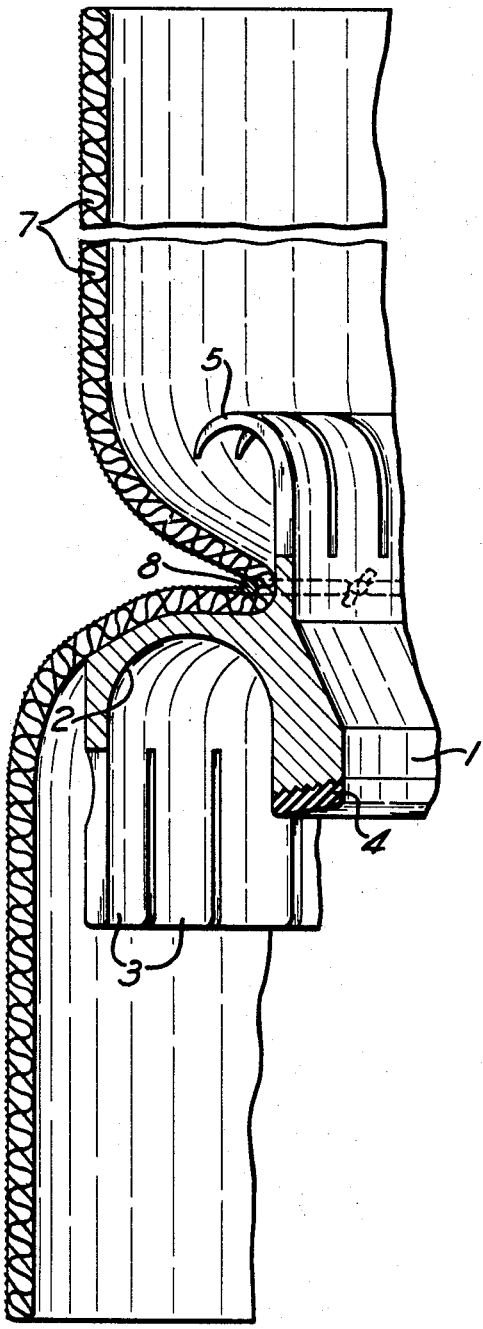

The valve can be described best by explaining the way in which it is made, which is illustrated in FIGS. 5 to 9. Thus, an annular metal frame 1 is provided, which defines the circular passage through which blood will flow to or from the heart. The frame, before it is assembled with the other parts of the valve, has a channel 2 therein facing one end as shown in FIG. 5. The outer wall of the channel is longer than the inner wall and is provided with a plurality of parallel slots to form a large number of circumferentially spaced fingers 3. The outer end of the inner wall of the channel carries a coating 4 of unvulcanized rubber-like material, such as silicone rubber. Projecting from the other end of the frame, substantially in line with the inner wall of the channel, is an annular row of prongs 5 having pointed outer ends curved outwardly.

Figure 2:
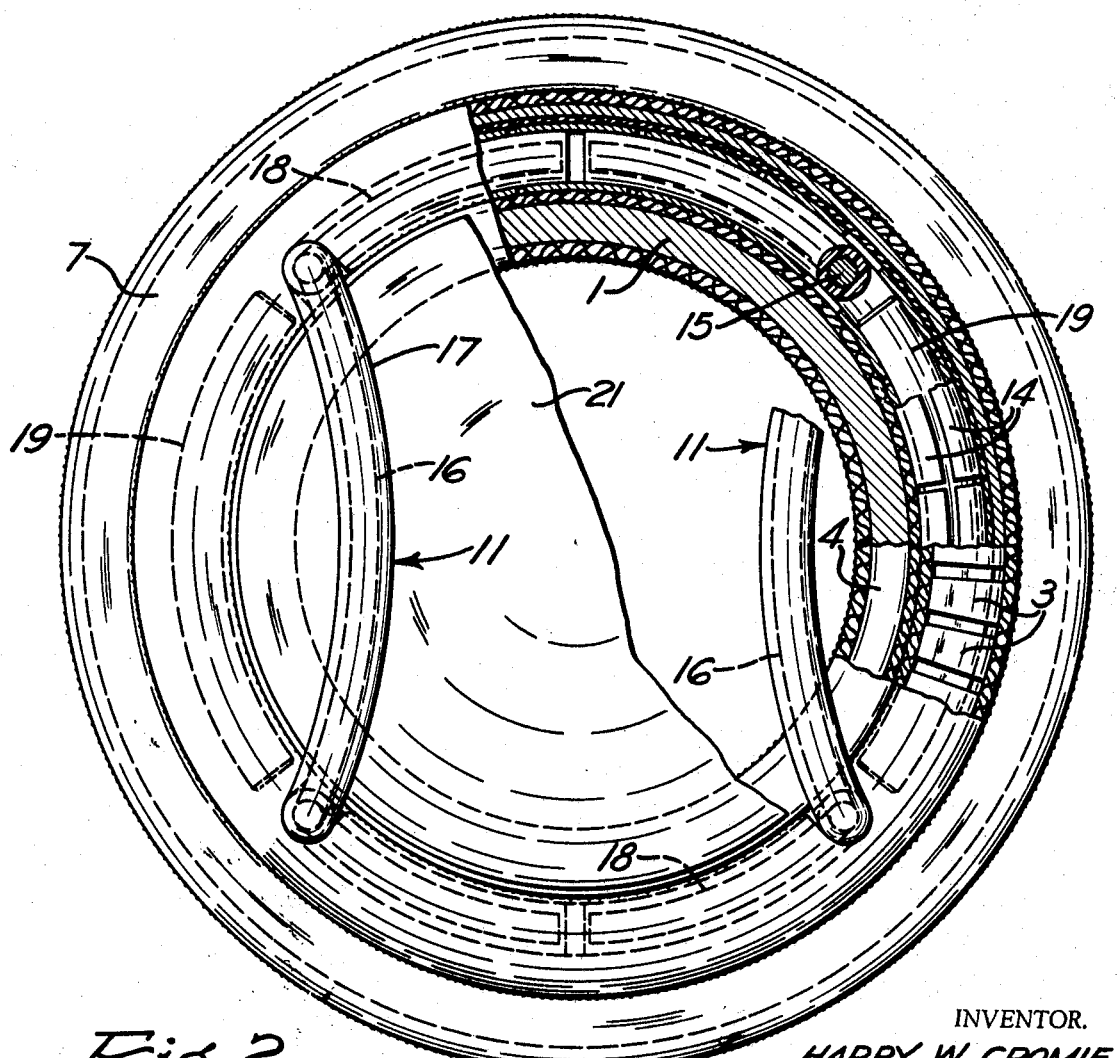
FIG. 2 is an end view of the valve, likewise partly broken away in section.
Figure 6:
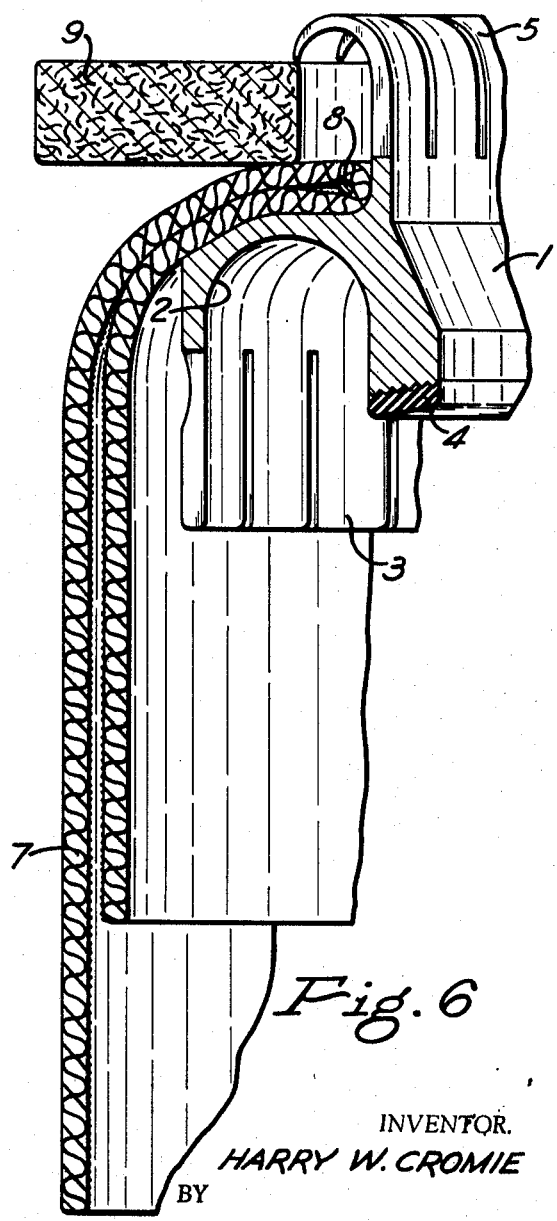

This frame is inserted in a short length of fabric 7 formed into a tube. Then the central portion of the tube is drawn in against the base of the prongs and held there by a thread 8, such as a Dacron suture, that is tied around the fabric. The next step in making the valve is to turn inside out the portion of the fabric tube that surrounds the prongs and pull it over the rest of the tube so that there are two layers as shown in FIG. 6, the outer layer being longer. This is done in order to expose the prongs so that a suturing ring 9 of a felted material, again preferably Dacron, can be slipped over them and placed against the outer layer of the fabric tube. The prongs then are bent outwardly to cause their pointed ends to penetrate the suturing ring and the layers of fabric between it and the frame, as shown in FIGS. 2, 4, and 7, to clamp the ring firmly in place. This is followed by turning the outer layer of the tube right side out again and pulling it around the suturing ring and prongs and then inserting it back through the frame so that its end can be connected to the opposite end of the tube. The two ends are fastened together in any suitable manner, such as by suturing stitches 10. The assembly now has the appearance shown in full lines in FIG. 7.

The fabric, of which the cover is made, must be capable of lasting for a lifetime. A synthetic plastic fabric, such as Dacron, is best. It also is highly desirable that the fabric have a velour surface that will be exposed, because such a surface is made up of innumerable fiber loops that human tissue can grow around, interlock with, and cling to and thereby form a firm and lasting union with the fabric.

Figure 1:
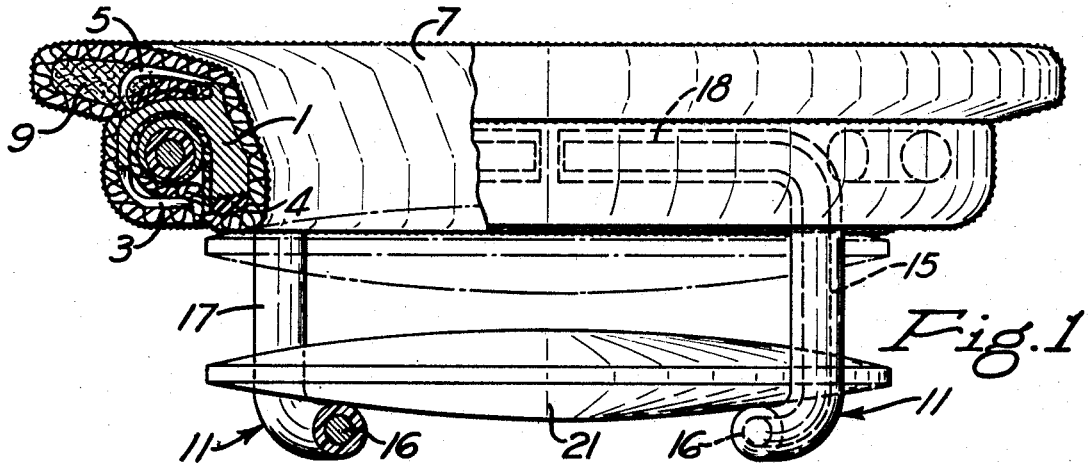

A valve cage is attached to the frame. This is done by first connecting a pair of struts 11 to a ring metal 12 and then mounting the ring in the frame channel 2. The ring originally has a channel 13 therein opening toward one end of the ring, as shown in FIG. 8. The side walls of the channel are provided with parallel slots to form circumferentially spaced fingers 14. There are two struts, each of which is formed as shown in FIGS. 1 and 2 from a wire that is bent to provide two substantially parallel legs 15 extending nearly at right angles away from a connecting portion 16 that is curved laterally. The wire is enclosed in a fabric or plastic sheath 17. The free end portions 18 of the struts are bent at right angles to the legs and extend away from them in the same general direction as the curved connecting portions 16. These ends 18 of the struts are curved on the same radius as the ring and are inserted in the ring channel with connecting portions 16 curving inwardly toward each other as shown in FIG. 2. The size of the struts is such that their four legs are disposed about 90° apart around the ring. Most of the space in the ring channel between the legs of each strut is filled by a tiny plastic rod 19 to prevent the ring from carrying an air bubble into the heart. After the rods and struts have been inserted in the metal ring, its fingers 14 are bent or swaged inwardly toward each other to clamp everything tightly together, whereby the valve cage is formed.

The next step is to drop a movable closure member through the ring and into the cage. This closure member may be a very light metal ball or a plastic disc 21 of Teflon or the like. The ring then is inserted in the channel of the frame. In doing this the ring forces the layer of fabric that covers the frame channel into the channel as shown in FIG. 9, where it will be seen that the fabric layer is sandwiched between the ring and the wall of the channel. The fingers 3 of the frame then are bent inwardly across the ring to lock it firmly in the frame as shown in the section forming part of FIG. 1. It also will be seen that the metal frame and ring and the suturing ring are all completely enclosed by the fabric cover. The joined frame and metal ring form the body of the valve. There are no exposed metal surfaces.

The portion of the fabric cover that extends across the coating 4 on the valve body forms a seat for disc 21. To shape and strengthen this seat, which will be struck by the valve disc about 40,000,000 times a year, the valve is heated for about four hours at 250° F. to cure the silicone and cause it to be vulcanized to the metal frame and to the fabric cover which it permeates. During the curing, the valve disc is held against the seat so that the latter will be conformed to the surface of the disc. The silicone-reinforced fabric forms a cushioned seat that will not be cut by the disc. The valve is now ready to be sewed into a heart opening, from which the natural valve has just been excised.

According to the provisions of the patent statutes, I have explained the principle of my invention and have illustrated and described what I now consider to represent its best embodiment.

I claim:

1. A prosthetic heart valve comprising an annular metal body forming a blood passage, struts connected to said body and extending away from it to form a cage at one end of the body, a suturing ring connected to the other end of the body and projecting radially outward therefrom, a fabric cover completely enclosing said body and ring and forming a valve seat at said one end of the body within the cage, said body being provided with circumferentially spaced prongs encircled by said suturing ring and having pointed ends projecting into the material of the suturing ring for holding it against said body, and a movable closure member loosely disposed in said cage and adapted to periodically engage said seat to close said blood passage intermittently.

2. A prosthetic heart valve according to claim 1, including a thread encircling said fabric cover and holding it against the base of said prongs.

3. A prosthetic heart valve comprising an annular metal frame forming a blood passage and provided with an annular opening around said passage, a metal ring rigidly mounted in said opening, struts joined to said ring and extending away from it to form a cage at one end of the frame, a suturing ring connected to the other end of the frame and projecting radially outward therefrom, a fabric cover completely enclosing said frame and rings and forming a valve seat at said one end of the frame within the cage, and a movable closure member loosely disposed in said cage and adapted to periodically engage said seat to close said blood passage intermittently.

4. A prosthetic heart valve according to claim 3, in which said metal ring is hollow and contains the inner ends of said struts to anchor them.

5. A prosthetic heart valve according to claim 3, in which said metal ring is hollow and said struts having arcuate inner end portions clamped inside the hollow ring and extending part way around it, and rods clamped in the hollow ring between said strut end portions substantially fill the spaces between them.

6. A prosthetic heart valve according to claim 3, in which one side of said annular opening is formed by fingers integral with said frame and bent across said metal ring to clamp it in the frame.

7. A prosthetic heart valve according to claim 6, in which said fabric cover extends past the free ends of said fingers into said annular opening and around the metal ring therein between the metal ring and the wall of the opening.

References Cited

UNITED STATES PATENTS

| | | | |
|---|---|---|---|
| 3,099,016 | 7/1963 | Edwards | 3—1 |
| 3,466,671 | 9/1969 | Siposs | 3—1 |
| 3,130,419 | 4/1964 | Edwards | 3—1 |
| 3,365,728 | 1/1968 | Edwards et al. | 3—1 |

FOREIGN PATENTS

| | | |
|---|---|---|
| 1,016,811 | 1/1966 | Great Britain. |
| 171,082 | 9/1965 | Russia. |

OTHER REFERENCES

"Prosthetic Replacement of the Mitral Valve," The Lancet, Nov. 24, 1962, p. 1087.

"Evaluation of Two Prostheses for Total Replacement of the Mitral Valve" by F. S. Cross et al., J. of Thoracic and Cardiovascular Surgery, vol. 46, No. 6, December 1963, pp. 719–725.

"Stainless Steel Disc Valve for Cardiac Valve Replacement" by K. R. Williams et al., J. of Thoracic and Cardiovascular Surgery, vol. 49, No. 4, April 1965, pp. 540–549.

"Outlook for Prosthetic Heart," Medical News, Jama., July 15, 1968, vol. 205, No. 3, pp. 28–30.

RICHARD A. GAUDET, Primary Examiner

R. L. FRINKS, Assistant Examiner